United States Patent
Breidenthal (10) Patent No.: US 9,284,886 B2
(45) Date of Patent: Mar. 15, 2016

(54) GAS TURBINE WITH COULOMBIC THERMAL PROTECTION

(71) Applicant: ClearSign Combustion Corporation, Seattle, WA (US)

(72) Inventor: Robert E. Breidenthal, Seattle, WA (US)

(73) Assignee: CLEARSIGN COMBUSTION CORPORATION, Seattle, WA (US)

( * ) Notice: Subject to any disclaimer, the term of this patent is extended or adjusted under 35 U.S.C. 154(b) by 556 days.

(21) Appl. No.: 13/712,652

(22) Filed: Dec. 12, 2012

(65) Prior Publication Data

US 2014/0338350 A1    Nov. 20, 2014

Related U.S. Application Data (60) Provisional application No. 61/704,306, filed on Sep. 21, 2012, provisional application No. 61/582,243, filed on Dec. 30, 2011.

(51) Int. Cl.
| | | |
|---|---|---|
| *F02M 27/04* | (2006.01) | |
| *F02C 7/18* | (2006.01) | |
| *F02C 7/00* | (2006.01) | |

(52) U.S. Cl.
CPC ... *F02C 7/18* (2013.01); *F02C 7/00* (2013.01); *F02M 27/04* (2013.01); *F05D 2260/202* (2013.01); *F23R 2900/03042* (2013.01); *Y02T 50/676* (2013.01)

(58) Field of Classification Search
CPC .. F23C 99/001; B64C 2230/12; F02M 27/04; F05D 2270/172

USPC ......... 60/805, 806, 39.827; 431/8; 415/173.2, 415/175, 177, 914

See application file for complete search history.

(56) References Cited

U.S. PATENT DOCUMENTS

| | | | |
|---|---|---|---|
| 1,153,182 | A | 9/1915 | Schniewind |
| 2,604,936 | A | 7/1952 | Kaehni et al. |
| 3,087,472 | A | 4/1963 | Asakawa |
| 3,224,485 | A | 12/1965 | Blomgren et al. |
| 3,306,338 | A | 2/1967 | Wright et al. |
| 3,358,731 | A | 12/1967 | Donnelly |

(Continued)

FOREIGN PATENT DOCUMENTS

| | | |
|---|---|---|
| WO | WO 96/01394 | 1/1996 |

OTHER PUBLICATIONS

James Lawton et al., Electrical Aspects of Combustion, 1969, p. 81, Clarendon Press, Oxford, England.

(Continued)

*Primary Examiner* — Steven Sutherland
(74) *Attorney, Agent, or Firm* — Christopher A. Wiklof; Nicholas S. Bromer; Launchpad IP, Inc.

(57) ABSTRACT

A gas turbine is configured to operate with a high temperature combustion gas stream. The gas turbine may include a combustor that provides a combustion gas stream including charged particles and at least one turbine stage including at least one high temperature surface that may be driven with a voltage selected to repel the charged particles. The at least one high temperature surface may output a film-cooling layer including cool air, the film-cooling layer being stabilized by Coulombic forces between the voltage and the charged particles.

37 Claims, 5 Drawing Sheets

(56) References Cited

U.S. PATENT DOCUMENTS

| | | | |
|---|---|---|---|
| 3,416,870 A | 12/1968 | Wright | |
| 3,503,348 A | 3/1970 | Dvirka | |
| 3,749,545 A | 7/1973 | Velkoff | |
| 3,841,824 A | 10/1974 | Bethel | |
| 3,869,362 A | 3/1975 | Machi et al. | |
| 4,052,139 A | 10/1977 | Paillaud et al. | |
| 4,091,779 A | 5/1978 | Saufferer et al. | |
| 4,093,430 A | 6/1978 | Schwab et al. | |
| 4,110,086 A | 8/1978 | Schwab et al. | |
| 4,111,636 A | 9/1978 | Goldberg | |
| 4,118,202 A | 10/1978 | Scholes | |
| 4,219,001 A | 8/1980 | Kumagai et al. | |
| 4,260,394 A | 4/1981 | Rich | |
| 4,304,096 A | 12/1981 | Liu et al. | |
| 4,340,024 A | 7/1982 | Suzuki et al. | |
| 4,439,980 A | 4/1984 | Biblarz et al. | |
| 4,649,260 A | 3/1987 | Melis et al. | |
| 4,675,029 A | 6/1987 | Norman et al. | |
| 4,903,616 A | 2/1990 | Mavroudis | |
| 4,987,839 A | 1/1991 | Krigmont et al. | |
| 5,048,288 A * | 9/1991 | Bessette et al. | 60/226.1 |
| 5,329,773 A | 7/1994 | Myers et al. | |
| 5,702,244 A | 12/1997 | Goodson et al. | |
| 6,640,549 B1 | 11/2003 | Wilson et al. | |
| 6,736,133 B2 | 5/2004 | Bachinski et al. | |
| 6,742,340 B2 | 6/2004 | Nearhoof, Sr. et al. | |
| 6,918,755 B1 | 7/2005 | Johnson et al. | |
| 6,948,906 B2 * | 9/2005 | Leishman et al. | 415/119 |
| 7,137,808 B2 | 11/2006 | Branston et al. | |
| 7,168,427 B2 | 1/2007 | Bachinski et al. | |
| 7,182,805 B2 | 2/2007 | Reaves | |
| 7,226,496 B2 | 6/2007 | Ehlers | |
| 7,226,497 B2 | 6/2007 | Ashworth | |
| 7,243,496 B2 | 7/2007 | Pavlik et al. | |
| 7,252,475 B2 * | 8/2007 | Tarelin et al. | 415/1 |
| 7,377,114 B1 | 5/2008 | Pearce | |
| 7,416,137 B2 | 8/2008 | Hagen et al. | |
| 7,485,981 B2 | 2/2009 | Schwarz et al. | |
| 7,523,603 B2 | 4/2009 | Hagen et al. | |
| 7,581,397 B2 * | 9/2009 | Strangman et al. | 60/751 |
| 7,637,462 B2 * | 12/2009 | Pal | 244/199.2 |
| 7,819,626 B2 * | 10/2010 | Lee et al. | 415/173.2 |
| 7,845,937 B2 | 12/2010 | Hammer et al. | |
| 8,082,725 B2 | 12/2011 | Younsi et al. | |
| 8,245,951 B2 | 8/2012 | Fink et al. | |
| 2005/0208442 A1 | 9/2005 | Heiligers et al. | |
| 2007/0020567 A1 | 1/2007 | Branston et al. | |
| 2010/0000223 A1 * | 1/2010 | Colotte et al. | 60/773 |
| 2010/0183424 A1 | 7/2010 | Roy | |
| 2011/0011556 A1 | 1/2011 | MacDonald | |
| 2011/0203771 A1 | 8/2011 | Goodson et al. | |
| 2012/0317985 A1 | 12/2012 | Hartwick et al. | |
| 2013/0004902 A1 | 1/2013 | Goodson et al. | |
| 2013/0071794 A1 | 3/2013 | Colannino et al. | |
| 2013/0170090 A1 | 7/2013 | Colannino et al. | |
| 2013/0230810 A1 | 9/2013 | Goodson et al. | |
| 2013/0230811 A1 | 9/2013 | Goodson et al. | |
| 2013/0255482 A1 | 10/2013 | Goodson | |
| 2013/0255548 A1 | 10/2013 | Goodson et al. | |
| 2013/0255549 A1 | 10/2013 | Sonnichsen et al. | |
| 2013/0260321 A1 | 10/2013 | Colannino et al. | |

OTHER PUBLICATIONS

PCT International Search Report and Written Opinion for PCT Application No. PCT/US2012/069590 mailed Feb. 19, 2013.

Altendrfner et al., "Electric Field Effects on Emissions and Flame Stability With Optimized Electric Field Geometry", Third European Combustion Meeting ECM 2007, p. 1-6.

William T. Brande; "The Bakerian Lecture: On Some New Electro-Chemical Phenomena", Phil. Trans. R. Soc. Lond. 1814 104, p. 51-61.

James Lawton and Felix J. Weinberg. "Electrical Aspects of Combustion". Clarendon Press, Oxford. 1969.

* cited by examiner

GAS TURBINE WITH COULOMBIC THERMAL PROTECTION

CROSS-REFERENCE TO RELATED APPLICATIONS

The present application claims priority benefit from U.S. Provisional Patent Application No. 61/704,306, entitled "GAS TURBINE WITH COULOMBIC THERMAL PROTECTION", filed Sep. 21, 2012; and U.S. Provisional Patent Application No. 61/582,243, entitled "GAS TURBINE WITH EXTENDED TURBINE BLADE STREAM ADHESION", filed Dec. 30, 2011; each of which, to the extent not inconsistent with the disclosure herein, is incorporated by reference.

BACKGROUND

Gas turbines, which (for example) are used in terrestrial power generation and jet/propjet aircraft propulsion, may burn fuel having an adiabatic flame temperature greater than the melting or softening point of parts such as turbine blades, turbine inlet guide vanes, turbine stators, turbine shaft, combustor walls, and/or other parts to which hot combustion products are exposed; and which may be individually or collectively referred to as (a) high temperature surface(s). Various approaches have been used to address this apparent barrier. For example, development of high temperature alloys has historically represented significant research emphasis. Air cooling has been used in various forms to provide convective heat transfer from heated surfaces.

While air cooling of some gas turbine parts has resulted in increases in allowable combustion gas temperature, achievable increases in temperature have been limited and generally do not allow for operation at full adiabatic flame temperature. For example, surface cooling has been less than optimal because cooling effects have been limited to small radii surrounding surface-penetrating fluid passages. For example, in turbine blade cooling applications, cooling air exits surface-penetrating cooling holes at relatively high velocity. While providing convective cooling to the inner diameter of the cooling holes themselves, the high velocity air also tends to disturb flow over the surface of the turbine blade, ultimately causing vortices that can bring hot combustion gases into contact with turbine blade surfaces peripheral to the cooling holes.

Combustion gas dilution and/or other stoichiometric imbalances have been used to reduce the temperature of combustion gases. Unfortunately, gas turbine thermodynamic efficiency is negatively affected by dilution the heat source with cooling air, because cooling air lowers the peak cycle temperature of the heat engine.

Thermodynamic efficiency may be expressed as a function of the ratio of heat source temperature to heatsink temperature. The heatsink temperature may be very close to or substantially equal to ambient air temperature (effective heat sink temperature may be influenced by flow losses). The heat source temperature has typically been limited, not by adiabatic flame temperature, but by material property limitations (as described above). Dilution of the combustion gases, and corresponding decrease in heat source temperature may cause some aircraft gas turbines such as turbofan engines to be limited in thermodynamic efficiency to around 37% maximum. Terrestrial gas turbines, such as those used to provide peak power to electric power grids, may typically reach a thermodynamic efficiency of around 60%, but must use a topping cycle to remove energy from the combustion gases in stages to limit peak temperatures. Topping cycle equipment (which may, for example, use non-stoichiometric, staged combustion) is generally associated with high capital costs and relatively large size.

Notwithstanding incorrect prior art references to "film-cooling", attempts to maintain an actual cooling film adjacent to high temperature surfaces has apparently not been tried, because cooling flow has been in the form of jets that, as described above, actually increase vorticity and heat flow to portions of heated surfaces peripheral to cooling holes.

What is needed is technology that allows a gas turbine to operate with higher thermodynamic efficiency by reducing dilution and/or topping cycles, while protecting high temperature surfaces such as turbine blades, combustor walls, turbine inlet guide vanes, turbine shaft, turbine stators and/or other heat-exposed parts from the increased temperature. What is also needed is a technology that may reduce gas turbine capital cost.

SUMMARY

According to an embodiment, a gas turbine may include a combustor configured to output a combustion gas stream and a turbine including at least one turbine stage configured to receive the combustion gas stream. The combustion gas stream may include charged particles having a first majority charge sign. One or more high temperature surfaces in the combustor and/or the turbine may be held or driven to a voltage having a polarity the same as the charged particles having the first sign. At least some of the high temperature surfaces may be operatively coupled to at least one air channel configured to distribute cool air adjacent to the high temperature surface. For example, the high temperature surface may include a turbine blade, and the at least one air channel may include a plurality of holes or slots at or near a leading edge of the turbine blade (e.g., near a stagnation point) configured to supply the cool air to the surface of the turbine blade. The cool air may form a film-cooling layer between the surface of the turbine blade and the combustion gas stream. The film-cooling layer may be stabilized by Coulombic repulsion forces between the voltage of the turbine blade and charged particles in the combustion gas stream.

According to another embodiment, a method for operating a gas turbine may include outputting a combustion gas stream to a turbine, the combustion gas stream including charged particles having a first majority charge. A first voltage selected to repel the charged particles having the first charge may be applied to one or more high temperature surface(s). For example, the high temperature surface(s) may include turbine blades of at least one stage of the turbine. Cool air may be provided to the surface of the high temperature surface(s) through a plurality of holes or slots at or near a leading edge of the high temperature surfaces(s) (e.g. near a flow stagnation point at the leading edge of turbine blades) to form a film-cooling layer between the high temperature surface(s) and the combustion gas stream. The film-cooling layer may be stabilized by a cascade effect caused by the repelling of the charged particles in the combustion gas stream by the first voltage.

According to another embodiment, a method for propelling an aircraft may include outputting a combustion gas stream to a turbine, the combustion gas stream including charged particles having a first charge, and applying to turbine blades of at least one stage of the turbine a first voltage selected to repel the charged particles having the first charge.

According to another embodiment, a method for generating electricity may include outputting a combustion gas stream to a turbine, the combustion gas stream including charged particles having a first charge, and applying to turbine blades of at least one stage of the turbine a first voltage selected to repel the charged particles having the first charge.

According to another embodiment, an aircraft may include a gas turbine. The gas turbine may include a combustor configured to output a combustion gas stream and a turbine including at least one turbine stage configured to receive the combustion gas stream. The combustion gas stream may include charged particles having a first sign when received by the at least one turbine stage. The at least one turbine stage may include turbine blades held or driven to a voltage having a polarity the same as the charged particles having the first sign.

According to another embodiment, an electric power generator may include a gas turbine. The gas turbine may include a combustor configured to output a combustion gas stream and a turbine including at least one turbine stage configured to receive the combustion gas stream. The combustion gas stream may include charged particles having a first sign when received by the at least one turbine stage. The at least one turbine stage may include turbine blades held or driven to a voltage having a polarity the same as the charged particles having the first sign.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

Figure 1:
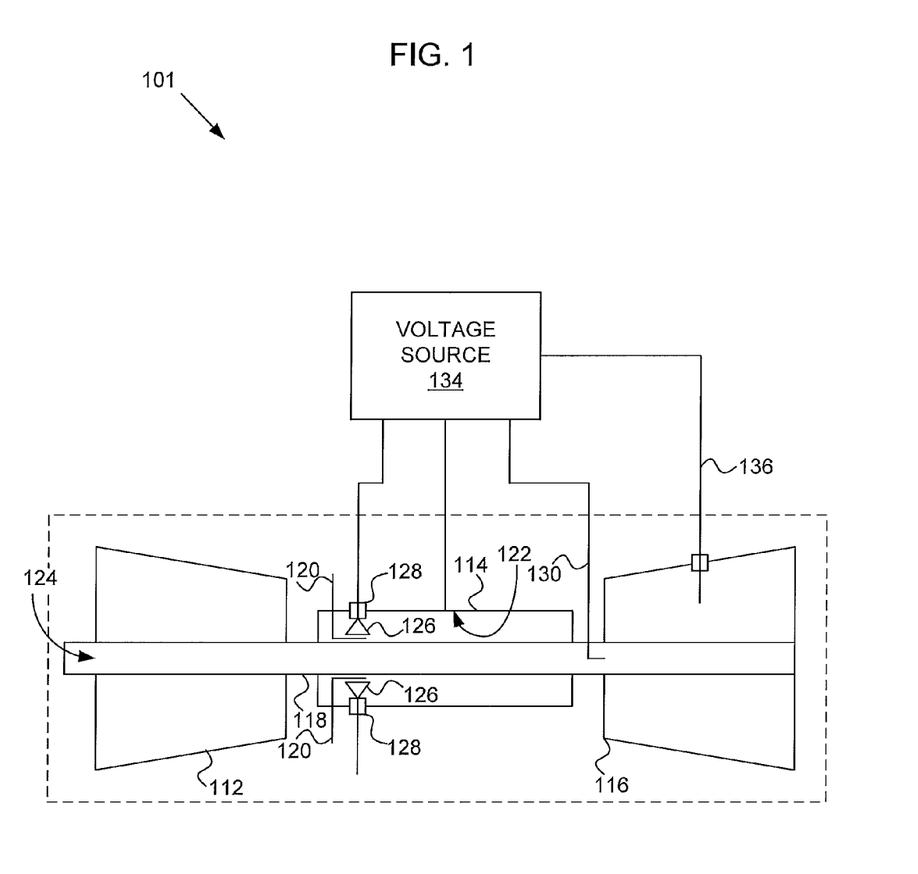
FIG. 1 is a block diagram of a gas turbine, according to an embodiment.

FIG. 1 is a block diagram of a gas turbine 101, according to an embodiment. The gas turbine 101 includes a compressor 112 configured to compress air, the compressed air then entering a combustor 114. Fuel is burned in the combustor 114 to raise the temperature of the air and produce combustion products. The hot combustion products exit the combustor 114 and travel through a turbine 116. The turbine 116 includes turbine blades attached to a shaft 118. The combustion gases impinging on the turbine blades cause rotation of the shaft 118, which provides power to the compressor 112. The shaft 118 may also be coupled to fan blades (such as in an aircraft jet engine, not shown) or an electrical power generator or alternator (such as in a terrestrial power generator or aircraft auxiliary power unit (APU), not shown).

Fuel is introduced to the combustor 114 through one or more nozzles 120. The combustor 122 includes a wall 122 that must be kept cool. Typically, the wall 122 may be cooled by introducing cool air through vents (not shown). The combustor wall 122 may also be cooled according to methods described herein.

Turbine blade cooling air may be admitted, such as through an air passage 124 formed by the shaft 118. The turbine blade cooling air provides cooling to the shaft 118 by forced convection, and travels into the turbine blades. Cooling of the turbine blades is described in greater detail in conjunction with FIGS. 2 and 3. According to an embodiment, one or more electrode(s) 126 may be disposed near the fuel nozzle(s) 120. Optionally, the one or more electrode(s) 126 may be coextensive with at least a portion of the fuel nozzle(s) 120. The electrode(s) 126 may apply a continuous or modulated voltage potential near flame(s) anchored by the fuel nozzle(s) 120.

During combustion, a flame produces charged intermediate species. These charged intermediates include free electrons, fuel and fuel fragments, oxygen radicals, etc. Conservation of charge dictates that positive and negative charges nominally balance such that the total charge is approximately neutral. The electrode(s) 126 may attract charge of opposite sign. For example, the electrode(s) 126 may be held or modulated to a positive voltage, and may responsively attract electrons from the flame. Similarly, the electrode(s) 126 may be held or modulated to a negative voltage, which responsively removes positively charges species from the flame. The electrode(s) 126 may be modulated across a positive and negative voltage range, may be modulated in voltage above and below a DC bias voltage, and/or may be held at a substantially constant DC bias voltage. According to embodiments, the electrode(s) 126 may be modulated between relative ground and a positive voltage of a few hundred volts at a time-varying frequency of a few kilohertz up to a few hundred kilohertz. Higher or lower voltages may be used and/or higher or lower frequency may be used.

The effect of at least intermittently or periodically removing charged particles of one sign or polarity from the flame results in a charge imbalance that may be used to apply Coulombic forces on the combustion gas. The applied Coulombic forces may directly affect the movement of charged particles, and the charged particles, in turn, may transfer momentum to uncharged particles. As used herein, a "particle" may include an aerosol such as unburned fuel, a gas molecule, an ion, and/or an electron, for example. As will be described below, the applied Coulombic forces may be used to repel hot gas from temperature-sensitive surfaces, such as turbine blades, turbine inlet guide vanes, turbine stators, the turbine shaft, and/or the combustor wall.

The electrode(s) 126 may be voltage isolated from other portions of the gas turbine 101 by suitable clearances (e.g., "air gaps") or electrical insulators 128. A voltage source 134 may provide the voltage to the electrode(s) 126. The voltage source 134 may also apply a voltage to the combustor wall 122 and to the turbine 116 blades and optionally turbine shaft 118 via a voltage conduction circuit 130. The voltage conduction circuit 130 may include one or more electrical insulators 132. Optionally, the voltage source 134 may provide different voltages to the electrode(s) 126, combustor wall 122, and/or turbine 116 blades. The voltage source 134 may include a DC voltage source and/or a modulated voltage source.

Figure 2:
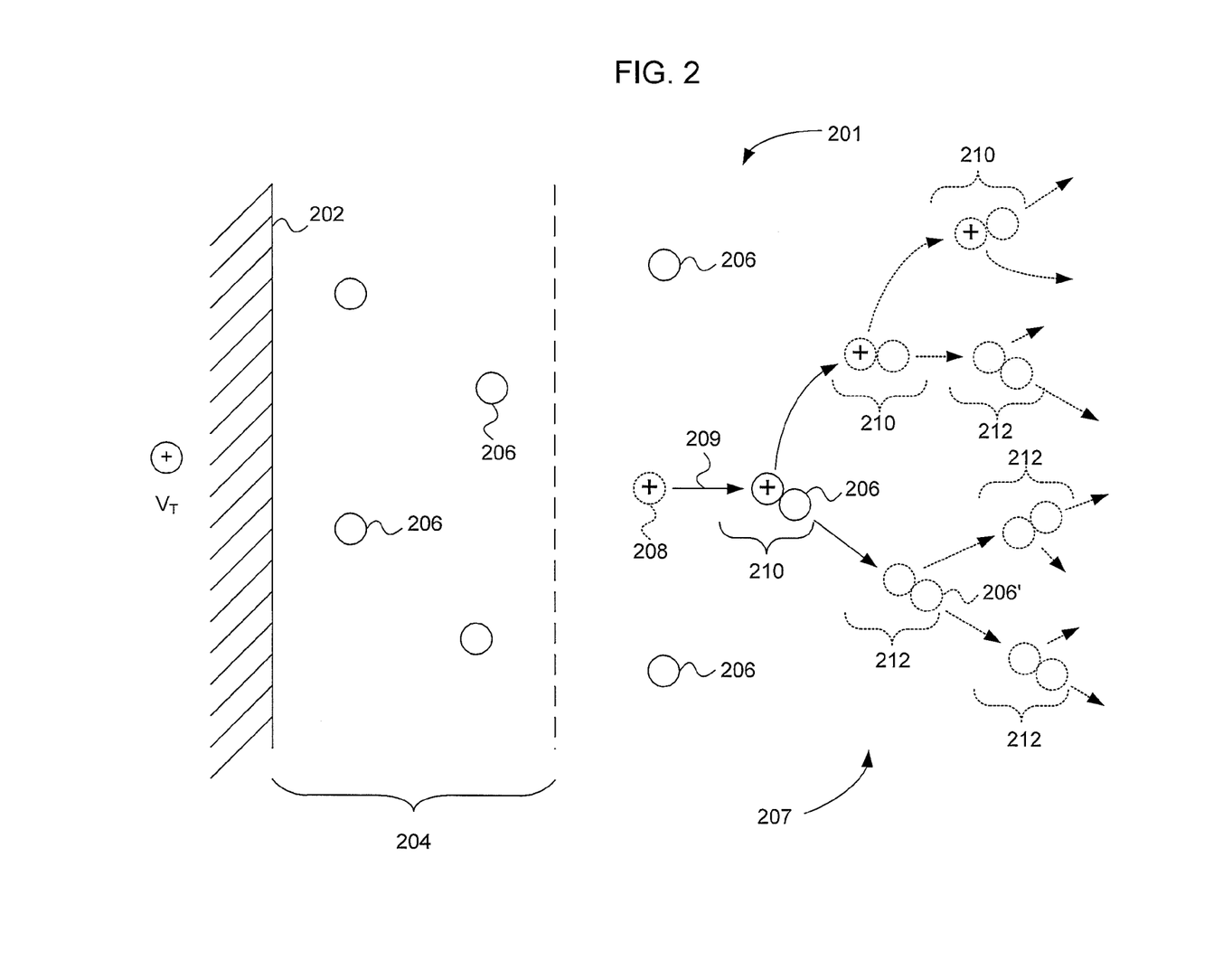
FIG. 2 is a diagram illustrating cascaded momentum transfer from coulombically repelled particles to neutral particles, according to an embodiment.

It is possible that alternative theories could be constructed to explain the conversion of Coulombic repulsion to electrostatic or electrodynamic acceleration g of the bulk region of the fluid. FIG. 2 is a diagram 201 illustrating cascaded momentum transfer from electrostatically-repelled particles to neutral particles, according to an embodiment. Throughout the description herein, it may be assumed that voltages are either too low to cause dielectric breakdown (arcing) or that passive or active voltage control will decrease voltages under conditions where dielectric breakdown or incipient dielectric breakdown occurs. While voltages and particle charges are shown as positive in FIG. 2, the same effect may be seen with negative voltages and negative particle charges (or, as will be described more fully below, sign-modulated similar charges). Accordingly, the principles illustrated by FIG. 2 may be applied to a system using one or more constant or modulated positive voltages, one or more constant or modulated negative voltages, or positive and negative voltages modulated in time. In most gas turbine systems, it may be assumed that each particle corresponds to a gaseous molecule, atom, or ion.

A body, such as a turbine blade 202, may be driven to or held at a voltage, $V_T$, such as a positive voltage. A film-cooling layer 204 may include substantially only neutral particles 206. Neutral particles 206 may be regarded as not interacting with the positive voltage $V_T$ of the body 202 (ignoring dipole interactions). Accordingly, the film-cooling layer 204 may be substantially unaffected by Coulombic forces.

A bulk region 207, separated from the body 202 by the film-cooling layer 204, may include neutral particles 206 and charged particles 208. For purposes of description, charged particles 208 may be regarded as positively charged. The positively charged particles 208 may be Coulombically (electrostatically) repelled by the same sign voltage $V_T$ of the body 202 and may be responsively accelerated along a path 209. The path 209 may be visualized as the positive particle 206 "falling" through a voltage gradient caused by the voltage $V_T$ of the body 202. The path 209 (e.g., the mean free path 209) typically has a probable distance inversely proportional to pressure. The path 209 eventually intersects another particle 206, whereupon a collision 210 between the charged particle 208 and a second particle 206 causes momentum transfer from the charged particle 208 to the second particle 206. For an average elastic collision (or a particular elastic collision of favorable orientation), momentum of the charged particle 208 may be halved, and the momentum of the second particle 206 may be increased by the same amount.

For systems where charged particles 208 are present in low concentration (which corresponds to most or all embodiments described herein), most collisions 210 involving a charged particle 208 may be binary interactions between the charged particle 208 and a neutral particle 206. After the collision 210, momentum transferred to the neutral particle 206 causes it to travel a distance near a mean free path until it undergoes a collision 212 with another particle after a time approximating a mean time between collisions. For systems where charged particles 208 are present in low concentration, most collisions 212 involving momentum transfer from a neutral particle 206 may be binary interactions between the first neutral particle 206 and a second neutral particle 206'. For an average elastic collision, half the momentum of the first neutral particle 206 may be transferred to the second neutral particle 206'. The first neutral particle 206 and the second neutral particle 206' may then travel along respective paths until each collides with other respective neutral particles in collisions 212 and momentum is again transferred. The series of neutral particle collisions 212 thus distribute momentum originally received from the charged particle 208 across a large number of neutral particles 206 according to a geometric $2^N$ progression in a parallel process.

Meanwhile, the charged particle 208 is again accelerated responsive to Coulombic interaction with the voltage $V_T$ of the body 202, and accelerates along a path to another collision 210, whereupon the process is repeated as described above.

According to an illustrative embodiment, charged particles 208 may be present in the free stream (also referred to as a combustion gas stream) 207 at a concentration on the order of one to one-hundred parts per billion (ppb). According to the geometric momentum distribution described above, momentum may be transferred from one charged particle 208 to a majority of all particles 202, 208 in the free stream 207 in about 24 to 30 generations of collisions 210, 212 ($2^{30} > 1 \times 10^9$, $2^{23} > 8 \times 10^6$). The amount of transferred momentum is a function of the voltage $V_T$ of the body 202, the magnitude of charge carried by the charged particle 208, the pressure of the free stream 207 (and hence the mean free path length), and the distance from the surface of the body 202 to the charged particle 208 at the point of each collision 210.

Because Coulombic forces substantially do not act on particles in the film-cooling layer 204, the film-cooling layer 204 undergoes substantially no repulsion. Moreover, the Coulombic repulsion acting on the charge-carrying free stream 207 may be viewed as producing a partial vacuum in regions between the surface of the charged body 202 and the free stream 207. The film-cooling layer 204 may thus also be viewed as being held in contact with the surface of the body 202 by the partial vacuum produced by evacuation of charged particles 208.

Figure 3:
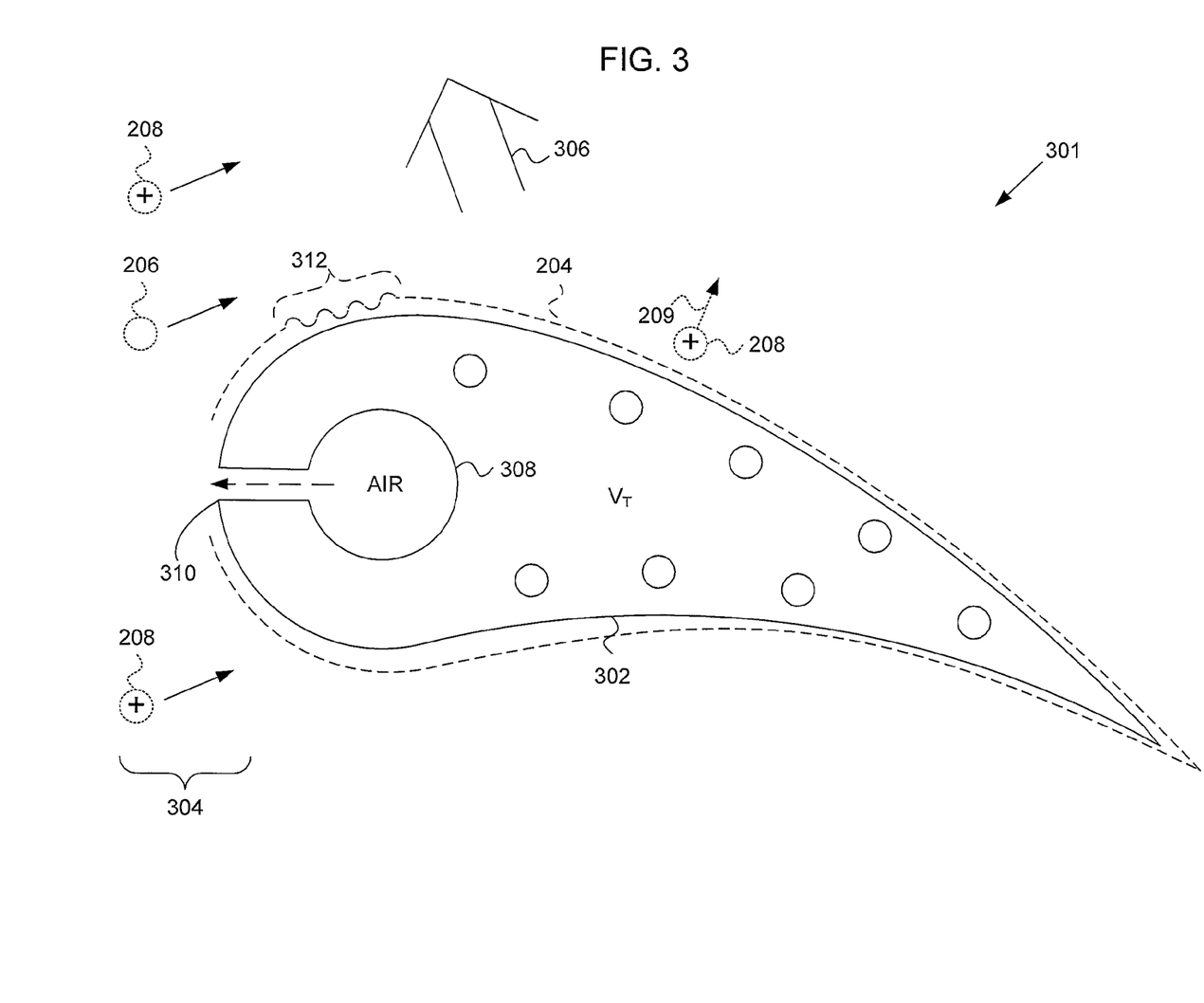
FIG. 3 is a stream-wise sectional diagram of a turbine blade configured for coulombic thermal protection, according to an embodiment.

FIG. 3 is a sectional diagram 301 of a turbine blade 302 configured for coulombic thermal protection, according to an embodiment. A hot combustion gas (a free stream) 304 including charged and uncharged species 206, 208 flows over the surface of the turbine blade 302. The turbine blade responsively produces a lift 306 that causes rotation of a turbine hub (not shown) and a turbine shaft (FIG. 1, 118) to which the turbine blade 302 is coupled.

The energy delivered by the turbine combustor (FIG. 1, 114) may be described as a change in enthalpy corresponding to an increase in gas temperature responsive to combustion, according to the relationship:

$$\Delta H = Cp \Delta T,$$

where:
$\Delta H$ is the change in enthalpy,
Cp is the specific heat of the gas at constant pressure, and
$\Delta T$ is the difference between air inlet temperature and outlet temperature.

One can then determine that the (undiluted) outlet temperature is determined according to the relationship:

$$T_H = T_i + \Delta H / Cp$$

where:
$T_H$ is the high temperature, and
$T_i$ is the inlet temperature, which may be calculated by multiplying the air temperature, $T_O$ by the pressure change provided by the compressor (FIG. 1, 112) according to the ideal gas law PV=nRT.

The thermodynamic efficiency of the turbine (FIG. 1, 116), typically modeled as a Brayton cycle, may be roughly approximated as a Carnot cycle, such that efficiency may be approximated as:

$$\eta \approx 1 - T_O / T_H.$$

But the maximum temperature $T_H$ must be low enough for the first stage turbine blade 302 to maintain its structural integrity (e.g., not melt). The adiabatic flame temperature of methane (natural gas, commonly used for terrestrial gas turbines) is 2200° K and that of kerosene (e.g., ~JP-4, commonly used for jet aircraft engines) is 2366° K. The standard ambient temperature at the earth's surface is 20° C. (293° K) and the standard temperature of the tropopause, where jet aircraft operate is −50.54° C. (216.5° K). Thus, the maximum Carnot cycle efficiencies that could be available for terrestrial and air gas turbines should approach:

$$\eta_{max} \approx 1-(216.5/2366) \approx 91\% \text{ (aircraft)}$$

$$\eta_{max} \approx 1-(293/2200) \approx 86\% \text{ (terrestrial)}$$

Unfortunately, achieved efficiencies are nowhere near these numbers, in large part because the maximum temperature $T_H$ that could be produced by the respective fuels is well above the melting points of modern turbine blade materials. For this reason the outlet temperature of the combustor (FIG. 1, 114) is diluted to reduce the temperature of hot combustion gas 304 faced by the first stage turbine blade 302. In modern gas turbines used in aircraft engines, for example, the combustion gas is diluted with ambient air to a temperature of 1370° C. (1643° K). At temperatures above this, turbine blades have been found to be susceptible to plastic creep failure and corrosion failure.

Returning again to FIG. 3, the turbine blade 302 includes a cooling air channel 308 configured to deliver cool air to the surface of the turbine blade 302 via a plurality of slots or holes 310 that may be disposed near a leading edge of the turbine blade 302. Delivery of the cooling air at this location may introduce vortices of opposite sign (not shown) in an area of air stagnation at the front edge of the turbine blade 302 resulting in minimum mixing of the free stream 304 with the cooling air. The cooling air may stream over the surface of the turbine blade as a film-cooling layer 204. The turbine blade 302, or at least one or more portions of the surface of the turbine blade 302, may be driven to or maintained at one or more voltages $V_T$. According to mechanisms described in conjunction with FIG. 2, the voltage(s) $V_T$ may repel same-sign charges 208 in the free stream 304, thus reducing or substantially eliminating mixing of the hot gas of the free stream 304 with the cool film-cooling layer air 204. As described above, this may be visualized as the charged particles 208 "falling" away from the voltage $V_T$ along a path 209, and then transferring momentum to uncharged particles in the free stream 304.

At high velocity, the free stream turbulence may form corrugations 312 in the film-cooling layer. "Troughs" of the corrugations are closer to the surface of the turbine blade 302, and therefore also at reduced distance from the driving voltage $V_T$. This effect may increase acceleration away from the turbine blade 302 applied to the fluid in the troughs according to an inverse distance squared ($1/h^2$) relationship, for example.

The ability of Coulombic repulsion to maintain a cooling film 204 against the hot gas of the free stream 304 can be analogized to the body force of gravity acting on water at a water-air interface. In order to keep the water-air interface relatively flat, the potential energy of that body force must be sufficiently large compared to the kinetic energy of the free stream turbulence. The ratio of these two energies defines a dimensionless Richardson number—which is an important parameter in stratified flow. In the present system, a Richardson number Ri may be defined as:

$$Ri=(gh)/u^2,$$

where:
g is an acceleration of the free stream 304 away from the turbine blade 302 due to Coulombic interaction, corresponding to the mechanism 201 shown in FIG. 2,
h is a representative distance from the surface of the turbine blade 302 (e.g., the thickness of the film-cooling layer 204), and
u is a representative velocity of the free stream 304 relative to the film-cooling layer 204 velocity.

If the Richardson number is of order one or larger, the potential energy of the body force is typically sufficient to stabilize the interface in the presence of the free stream 304 turbulence and thus preserve the film 204. Embodiments disclosed herein may be used for manipulation of the system's Richardson number. Factors that influence the Richardson number may include ion 206 concentration, electric field strength (e.g. by selecting the voltage $V_T$), free stream 304 turbulence intensity, and air film 204 thickness.

Rotation of the turbine blades on the rotor may be expected to modify the interface between the free stream 304 and the film-cooling layer 204 at locations 312 due to the effective density ratio between the free stream 304 and the film-cooling layer 204 and due to Ekman layer pumping. A larger Richardson number may provide a more robust the interface and resistance to rotation effects. Thus, a large Richardson number may permit a thinner film-cooling layer 204 and a lower flow rate of cooling air. As indicated above, reducing dilution of hot combustion gases 304 may result in higher thermodynamic efficiency. According to an embodiment, an optimal rate of cooling air flow via the slots or holes 310 may correspond to a Richardson number of about one, wherein the Richardson number is defined to include the kinetic energy of the turbulence from both rotation and the free stream flow.

According to embodiments described herein, the film-cooling layer 204 may provide isolation from the hot gas 304 to the turbine blade 302. This can reduce or eliminate convective heating of the surface of the turbine blade 302, and may leave substantially only radiative heat transfer from the free stream 304 to the turbine blade 302. Because the emissivity of the (substantially transparent) free stream 304 may typically be very low, radiative heat transfer may be very inefficient, and may therefore be neglected.

Use of the Coulombic cooling mechanism illustrated by FIGS. 2 and 3 may allow higher free stream 304 temperatures, which reduces dilution requirements and may result in greater thermodynamic efficiency. The approaches described herein may be combined with other approaches for increasing allowable turbine blade temperatures, including internal cooling air circulation, the use of high temperature blade materials, and the use of high temperature blade coatings.

The voltage and charge sign applied respectively to the high temperature surface and the combustion gas stream may be substantially constant during operation, according to an embodiment. According to another embodiment, the voltage and/or charge signs may be time-varying.

Figure 4:
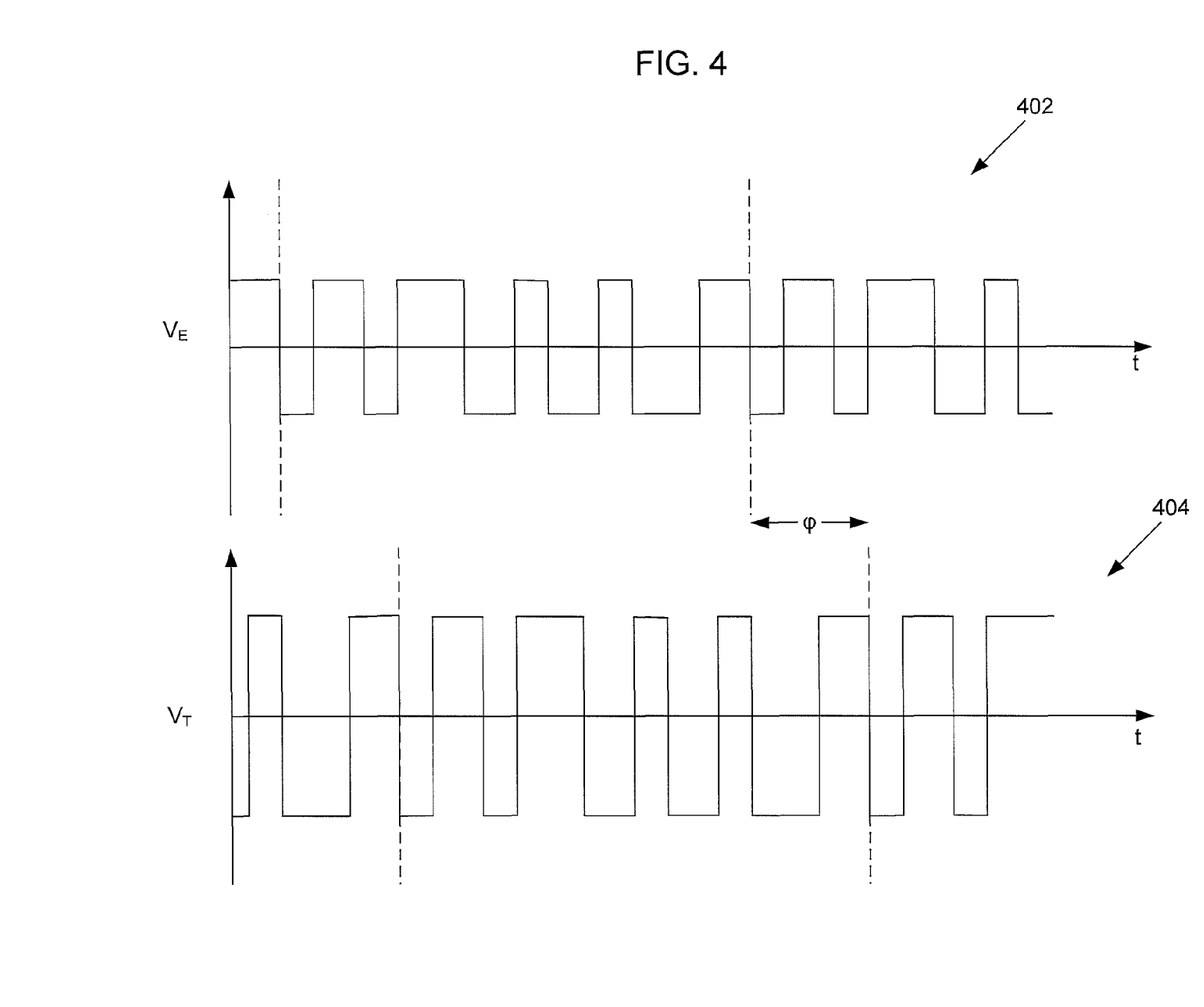
FIG. 4 is a timing diagram showing illustrative voltage waveforms respectively applied to electrodes of FIG. 1 and turbine blades of FIG. 3, according to an embodiment.

FIG. 4 is a timing diagram showing illustrative voltage $V_E$, $V_T$ waveforms 402, 404 that may be respectively applied to electrode(s) 126 of FIG. 1 and turbine blades 302 of FIG. 3, according to an embodiment. As described above, the voltage delivered to the electrode(s) 126 may be modulated. One advantage to voltage modulation may be a decrease in power consumed by the voltage source 134. Modulated electrode(s) 126 may be driven from a balanced circuit that stores charge in a charge storage apparatus such as a capacitor or capacitor array, or other R-C circuit, which may result in reduced amplifier power consumption. Optionally, such a modulation circuit may be driven in resonance to further reduce power consumption. Driving the electrode(s) 126 in a modulated waveform may also reduce leakage current by allowing isolation of the gas turbine 101 to be provided by high impedance couplings rather than perfect insulators.

One outcome of modulating the electrode(s) 126 may be visualized in conjunction with FIG. 1. A positive voltage impressed upon the electrode(s) 126 at a first instance may withdraw electrons from the combustion gas, and result in a localized concentration of positively charged particles. However, the positively charged particles must travel from the combustor 114 to the turbine 116 over a finite time. A subsequent instantaneous neutral or negative voltage impressed upon the electrode(s) 126 will similarly result in a localized neutrally charged region or a localized concentration of negatively charged particles. The time delay caused by travel time of the charged regions from the combustor 114 to the turbine 116 could have deleterious effects unless the time delay is compensated for.

Referring again to FIG. 4, the turbine voltage $V_T$ waveform may be delayed from the electrode voltage $V_E$ waveform by a phase offset $\phi$, as shown. While the phase offset $\phi$ is shown as a fraction of a period, the phase offset $\phi$ may alternatively be made to accommodate a charged particle travel time of several periods. Alternatively, the waveforms $V_T$, $V_E$ may substantially not form a repeating period, and the offset may be expressed as a time rather than phase. It will be understood that references to phase are made for ease of understanding, and that a time offset may be substituted in appropriate expressions. The phase offset $\phi$ may be provided by a delay line from the voltage source (FIG. 1, 134), or alternatively may be produced by a synchronized voltage driver. Optionally, the voltage waveforms $V_E$, $V_T$ may be driven according to a random, pseudo-random, or long bit-length pattern (as shown) configured to reduce system resonance.

According to the waveforms $V_E$, $V_T$ of FIG. 4, the turbine blade voltage $V_E$, $V_T$ may be synchronized such that (except for pulse edges) $V_E$, $V_T$ is substantially always at a voltage having the same sign as the passing charged particles, and therefore may substantially always repel the free stream 304 according to the mechanism described in conjunction with FIGS. 2 and 3.

Alternatively, when the modulated waveform $V_E$ includes a DC bias such that all portions of the waveform $V_E$ are one sign (polarity), the waveform $V_T$ may be modulated inversely to (but within the same sign as) the waveform $V_E$ such that the magnitude of free stream repulsion is maintained or varied less ($V_T$ being used to compensate for a lower concentration of charged particles 208 in the free stream).

Optionally, a gas turbine warm-up cycle may be associated with an out-of-phase waveform or no voltage waveform(s) to allow the hot gas in the free stream 304 to quickly bring the turbine blade 302 to operating temperature.

Referring to FIG. 1, an optional counter-ion injection lead 136 may optionally provide charge of opposite sign to the charge imbalance in the gas stream, and thus allow the combustion reaction to proceed to completion. Optionally, the counter-ion injection lead 136 may be configured to inject the counter-ions after the first stage turbine blades 302, between later turbine stages, or at the outlet end of the turbine 116. The counter-ion injection lead may produce exhaust gas that is less reactive than a charged gas stream, thereby reducing environmental effects of the system described herein. The counter-ion injection lead may further be used to balance charges delivered by the voltage source 134, and thereby reduce power consumption and/or charge bleed to isolated system components.

Figure 5:
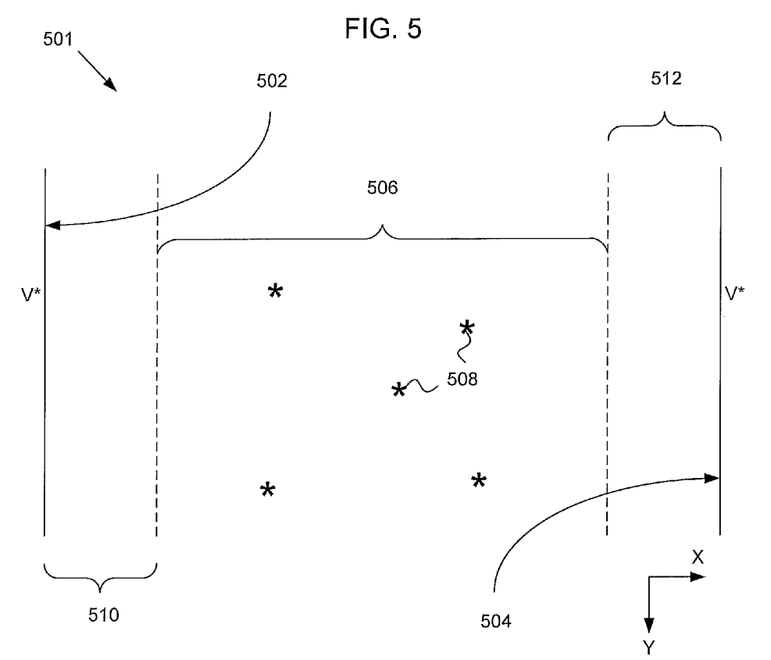
FIG. 5 is side sectional diagram of a hot gas flow volume partially bounded by two juxtaposed high temperature surfaces, according to an embodiment.

FIG. 5 is a side sectional diagram of a hot gas flow volume 501 partially bounded by two juxtaposed high temperature surfaces 502, 504, according to an embodiment. The hot gas flow volume 501 may include a charged volume 506 carrying charged particles 508, and a pair of film-cooling layers 510, 512 adjacent to the respective high temperature surface 502, 504. The film-cooling layers 510, 512 may be substantially uncharged and substantially neutral. The high temperature surfaces 502, 504 may instantaneously be driven to a voltage V* having the same polarity as the sign of the instant charged particles 508.

One aspect of Coulombic protection includes the provision of an at least instantaneous electric field formed from a voltage or charge gradient. Charged particles may be driven across the electric field. In the example shown in FIG. 5, the voltage gradient may be formed between a high voltage V* carried by a high temperature surface 502 and a somewhat lower voltage-equivalent expressed as a charge density in the charged volume 506. The voltage gradient may asymptotically approach zero near a center of the charged volume 506, which may be visualized as like charged particles repelling one another nearly omnidirectionally according to proximity between like charges.

Figure 6:
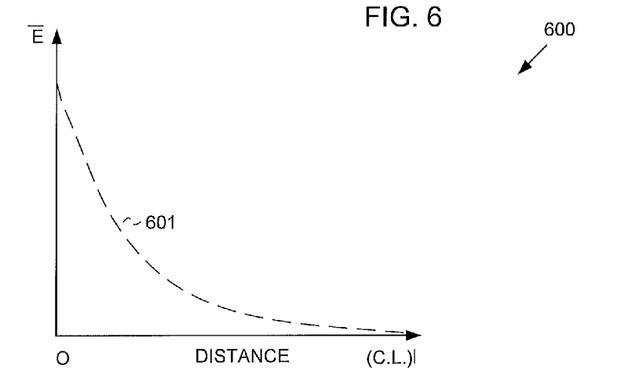
FIG. 6 is a prophetic diagram showing electric field strength, $\bar{E}$ as a function of distance from a high temperature surface, according to an embodiment.

FIG. 6 is a prophetic diagram 600 showing electric field strength, $\overline{E}$ as a function of distance from a high temperature surface. The vertical axis, though not to scale, may be considered to be in units of volts per meter or other convenient units. The voltage V* placed on the high temperature surface 502 may be assumed to be below an ionization onset voltage, and hence the high temperature surface 502 may avoid becoming a charge source. The horizontal axis of FIG. 6 is registered to a corresponding axis through FIG. 5. Distance 0 corresponds to the high temperature surface. The horizontal axis may be visualized as being parallel to a normal to a locally equipotential surface. In the case of a simple planar geometry. the horizontal axis may extend along a normal to the high temperature surface 502 proceeding from distance 0 at the high temperature surface to 1 at a centerline (C.L.) of the hot gas flow volume 501 (the centerline (C.L.) being equally spaced from two equipotential high temperature surfaces 502, 504). As may be seen, the electric field strength $\overline{E}$ may decrease monotonically with distance from the high temperature surface 502. The greatest slope, and hence the greatest electrostatic repulsion between the high temperature surface 502 and a same polarity charged particle occurs near the high temperature surface 502 in the film-cooling layer 510. Diffusion and repulsion forces may cause the edge (illustrated as the leftmost dashed line in FIG. 5) between the film-cooling layer 510 and the charged volume 506 to be indistinct. The indistinctness of the interface plus a "shadow" effect of the high temperature surface 502 may cause the electric field strength to be a continuous function as shown, rather than a discontinuous function. In any event, the high slope of the electric field in the film-cooling layer 510, and especially nearer the high temperature surface 502 bounding the film-cooling layer, causes the charged particles to be repelled from the high temperature surface 502, thus preserving the film-cooling layer 510 and preserving the corresponding thermal isolation between the hot gases in the charged volume 506 and the high temperature surface 502.

While various aspects and embodiments have been disclosed herein, other aspects and embodiments are contemplated. The various aspects and embodiments disclosed herein are for purposes of illustration and are not intended to be limiting, with the true scope and spirit being indicated by the following claims.

What is claimed is:

1. A gas turbine, comprising:
a combustor configured to output a combustion gas stream;
a turbine including at least one turbine stage configured to receive the combustion gas stream;
one or more high temperature surfaces in the combustor, the turbine, or the combustor and the turbine;
a voltage source operatively coupled to at least one of the high temperature surfaces, and configured to at least intermittently apply a voltage having a polarity to the high temperature surface; and
one or more sources of charged particles, configured to add charged particles to the combustion gas stream before the combustion gas stream reaches the high temperature surface, the charged particles having a first sign;
wherein the first sign has the same polarity as the polarity of the voltage to which at least one of the high temperature surfaces is driven.

2. The gas turbine of claim 1, wherein the at least one turbine stage includes turbine blades held or driven to the voltage having the same polarity as the charged particles in the combustion gas stream.

3. The gas turbine of claim 1, wherein the high temperature surface includes one or more of a turbine blade, a turbine inlet guide vane, a turbine stator, a turbine shaft, or a combustor wall.

4. The gas turbine of claim 1, wherein the combustor is configured to output the combustion gas stream including the charged particles having the first sign.

5. The gas turbine of claim 4, wherein the one or more sources of charged particles further includes at least one selected from the group consisting of
one or more fuel injectors configured to be at least periodically driven to a voltage having a polarity the same as the polarity of the charged particles and
one or more electrodes proximate the one or more fuel injectors and configured to be at least periodically driven to a voltage having a polarity the same as the polarity of the charged particles;
wherein the one or more fuel injectors or one or more electrodes are configured to at least periodically attract and remove from the combustion gas stream charged particles having a second sign opposite to the first sign.

6. The gas turbine of claim 1, wherein the at least one high temperature surface further comprises:
at least one air channel inside the high temperature surface configured to distribute cool air; and
a plurality of holes or slots at or near a leading edge of the high temperature surface configured to supply the cool air to a surface of the high temperature surface;
wherein the cool air forms a film-cooling layer between the surface of the high temperature surface and the combustion gas stream.

7. The gas turbine of claim 6, wherein the film-cooling layer is stabilized by Coulombic repulsion of the charged particles by the voltage to which the high temperature surface is held or driven.

8. The gas turbine of claim 6, wherein the voltage and a concentration of the charged particles are selected to maintain a Richardson number sufficient to stabilize the film-cooling layer.

9. The gas turbine of claim 8, wherein the Richardson number is defined as:

$Ri = (gh)/u^2$, where:
g is an acceleration of the combustion gas stream away from the high temperature surface due to Coulombic interaction between the charged particles and the voltage to which the high temperature surface is held or driven,
h is a representative distance from the surface of the high temperature surface, and
u is a representative velocity of the combustion gas stream relative to a film-cooling layer velocity.

10. The gas turbine of claim 6, wherein the combustion gas stream is held away from the high temperature surface by Coulombic repulsion of the charged particles and a momentum cascade from the charged particles to non-charged particles.

11. The gas turbine of claim 1, wherein the one or more sources of charged particles includes an electrode for generating the charged particles, and further comprising:
at least one voltage source configured to drive the electrode and the high temperature surfaces.

12. The gas turbine of claim 11, wherein the voltage source is configured to drive the electrode and the high temperature surfaces to constant voltages.

13. The gas turbine of claim 11, wherein the voltage source is configured to drive the electrode and the high temperature surfaces to modulated voltages.

14. The gas turbine of claim 13, wherein the voltage source is configured to drive the high temperature surfaces with a phase delay from the electrode to allow for time for the charged particles to stream from the electrode to the high temperature surfaces.

15. The gas turbine of claim 11, wherein the at least one electrode includes at least a portion of a fuel injector.

16. The gas turbine of claim 1, further comprising;
at least one shaft operatively coupled to the turbine; and
an electric power generator operatively coupled to the at least one shaft.

17. The gas turbine of claim 1, further comprising:
at least one shaft operatively coupled to the turbine; and
a ducted fan or propeller operatively coupled to the at least one shaft.

18. An aircraft including the gas turbine of claim 1.

19. An electric power generator including the gas turbine of claim 1.

20. A method for operating a gas turbine, comprising:
outputting a combustion gas stream from a combustor to a turbine, the combustion gas stream including charged particles having a first charge;
applying to at least one high temperature surface of the combustor or the turbine a first voltage selected to repel the charged particles having the first charge; and
operating one or more sources of charged particles to add the charged particles to the combustion gas stream.

21. The method for operating a gas turbine of claim 20, wherein outputting a combustion gas stream including charged particles having the first charge further comprises:
operating the combustor and the one or more sources of charged particles to produce the combustion gas stream including the charged particles.

22. The method for operating a gas turbine of claim 21, wherein operating the combustor to produce the combustion gas stream including the charged particles further comprises:
at least periodically driving one or more fuel injectors or one or more electrodes proximate the one or more fuel injectors to a voltage having a polarity the same as the polarity of the charged particles to at least periodically attract and remove from the combustion gas stream charged particles having a second charge opposite to the first charge.

23. The method for operating a gas turbine of claim 20, wherein outputting a combustion gas stream including charged particles having the first charge further comprises:
   operating one or more sources of charged particles in the combustor to add the charged particles to the combustion gas stream.

24. The method for operating a gas turbine of claim 23, further comprising:
   holding the combustion gas stream away from the at least one high temperature surface by Coulombic repulsion of the charged particles and a momentum cascade from the charged particles to non-charged particles.

25. The method for operating a gas turbine of claim 20, further comprising:
   providing cool air through a plurality of holes or slots at or near a leading edge of the at least one high temperature surface to form a film-cooling layer between surfaces of the at least one high temperature surface and the combustion gas stream.

26. The method for operating a gas turbine of claim 25, further comprising:
   stabilizing a film-cooling layer by the repelling of the charged particles by the first voltage.

27. The method for operating a gas turbine of claim 20, further comprising:
   selecting the first voltage, a concentration of the charged particles, or the first voltage and the concentration of the charged particles to maintain a Richardson number sufficient to stabilize a film-cooling layer.

28. The method for operating a gas turbine of claim 27, wherein the Richardson number is defined as:

$$Ri=(gh)/u^2,$$

where:
   g is an acceleration of the combustion gas stream away from the at least one high temperature surface due to Coulombic interaction between the charged particles and the voltage to which the at least one high temperature surface is held or driven,
   h is a representative distance from the surface of the at least one high temperature surface, and
   u is a representative velocity of the combustion gas stream relative to a film-cooling layer velocity.

29. The method for operating a gas turbine of claim 28, wherein the first voltage and the second voltage are constant voltages.

30. The method for operating a gas turbine of claim 20, further comprising:
   operating at least one voltage source to apply a second voltage to an electrode in the combustor to generate the charged particles, and to apply the first voltage to the at least one high temperature surface.

31. The method for operating a gas turbine of claim 30, wherein operating at least one voltage source includes driving the electrode and the at least one high temperature surface to modulated voltages.

32. The method for operating a gas turbine of claim 31, wherein driving the electrode and the at least one high temperature surface to modulated voltages includes driving the at least one high temperature surface with a phase delay relative to the electrode to allow for time for the charged particles to stream from the electrode to the at least one high temperature surface.

33. The method for operating a gas turbine of claim 30, wherein the electrode includes at least a portion of a fuel injector.

34. The method for operating a gas turbine of claim 20, further comprising:
   driving an electric power generator operatively coupled to the turbine.

35. The method for operating a gas turbine of claim 20, further comprising:
   driving a ducted fan or propeller operatively coupled to the turbine.

36. A method for propelling an aircraft, comprising the method for operating a gas turbine of claim 20.

37. A method for generating electricity, comprising the method for operating a gas turbine of claim 20.

* * * * *